US008874937B2

(12) United States Patent
Carapelli (10) Patent No.: US 8,874,937 B2
(45) Date of Patent: Oct. 28, 2014

(54) FUEL DISPENSER USER INTERFACE (75) Inventor: Giovanni Carapelli, Firenze/Florence (IT)

(73) Assignee: Gilbarco, S.r.l., Firenze (IT)

(*) Notice: Subject to any disclaimer, the term of this patent is extended or adjusted under 35 U.S.C. 154(b) by 727 days.

(21) Appl. No.: 12/797,094

(22) Filed: Jun. 9, 2010

(65) Prior Publication Data

US 2011/0134044 A1    Jun. 9, 2011

Related U.S. Application Data (60) Provisional application No. 61/185,451, filed on Jun. 9, 2009.

(51) Int. Cl.
| | |
|---|---|
| *G06F 21/00* | (2013.01) |
| *G06F 21/10* | (2013.01) |
| *G07F 19/00* | (2006.01) |
| *G07F 9/02* | (2006.01) |
| *G06F 21/86* | (2013.01) |
| *G07F 13/02* | (2006.01) |

(52) U.S. Cl.
CPC ...... *G07F 9/02* (2013.01); *G06F 21/10* (2013.01); *G07F 19/205* (2013.01); *G06F 21/86* (2013.01); *G07F 13/025* (2013.01); *G07F 19/20* (2013.01); *Y10S 257/922* (2013.01)
USPC .......................................... 713/194; 257/922

(58) Field of Classification Search
None
See application file for complete search history.

(56) References Cited

U.S. PATENT DOCUMENTS

| | | |
|---|---|---|
| 5,842,188 A | 11/1998 | Ramsey et al. |
| 5,928,320 A | 7/1999 | Forsythe |
| 6,065,679 A | 5/2000 | Levie et al. |
| 6,119,110 A | 9/2000 | Carapelli |
| 6,607,124 B1 | 8/2003 | Junkins et al. |
| 6,758,404 B2 | 7/2004 | Ladyansky |
| 6,917,299 B2 * | 7/2005 | Fu et al. ............... 340/686.1 |

(Continued)

FOREIGN PATENT DOCUMENTS

| | | |
|---|---|---|
| BR | PI 9201817-3 A | 11/1993 |
| BR | PI 9303931-0 A | 6/1995 |

(Continued)

OTHER PUBLICATIONS

International Search Report and Written Opinion mailed on Sep. 23, 2010 by the European Patent Office as the International Search Authority for copending international application No. PCT/EP2010/058118.

(Continued)

*Primary Examiner* — Jason K. Gee
*Assistant Examiner* — Maung Lwin
(74) *Attorney, Agent, or Firm* — Nelson Mullins Riley & Scarborough, LLP (57) ABSTRACT

A user interface for a fuel dispenser has a display, a display controller, and control circuitry. The control circuitry includes a processing device, memory, and at least one microswitch. The display controller and the control circuitry are positioned such that the microswitch connects the control circuitry to the display controller. The microswitch is activated if the control circuitry is separated from the display controller. Activation of the microswitch causes any sensitive information stored by the control circuitry to be erased. In one aspect, separation of the display controller from the control circuitry is the only manner by which the processing device and/or the memory may be accessed.

37 Claims, 3 Drawing Sheets

(56) References Cited

U.S. PATENT DOCUMENTS

| | | | |
|---|---|---|---|
| 7,254,463 B1 * | 8/2007 | Moore | 700/241 |
| 7,898,413 B2 | 3/2011 | Hsu et al. | |
| 7,902,993 B2 | 3/2011 | DeMarco | |
| 2003/0069792 A1 | 4/2003 | Blumenthal | |
| 2005/0211766 A1 | 9/2005 | Robertson et al. | |
| 2006/0016884 A1 * | 1/2006 | Block et al. | 235/381 |
| 2006/0167811 A1 | 7/2006 | Bhambri et al. | |
| 2006/0235796 A1 | 10/2006 | Johnson et al. | |
| 2007/0016963 A1 * | 1/2007 | Robinson | 726/34 |
| 2007/0109462 A1 * | 5/2007 | Lee et al. | 349/58 |
| 2008/0120191 A1 * | 5/2008 | Long | 705/18 |
| 2008/0269947 A1 * | 10/2008 | Beane et al. | 700/237 |
| 2009/0038019 A1 * | 2/2009 | Tatai et al. | 726/34 |
| 2009/0058641 A1 * | 3/2009 | DeMarco | 340/540 |
| 2009/0184850 A1 * | 7/2009 | Schulz et al. | 341/22 |
| 2010/0060452 A1 * | 3/2010 | Schuster et al. | 340/572.1 |

FOREIGN PATENT DOCUMENTS

| | | |
|---|---|---|
| BR | PI 9400557-5 A | 10/1995 |
| BR | MU 7501949-3 U | 8/1996 |
| BR | MU 7502179-0 U | 8/1996 |
| BR | PI 9504461-2 A | 8/1996 |
| BR | PI 9504462-0 A | 12/1996 |
| BR | PI 9502194-9 A | 5/1997 |
| BR | PI 0204961-9 A | 11/2002 |
| BR | PI 0400208-3 A | 12/2005 |
| BR | PI 9805517-8 A | 6/2006 |
| BR | PI 0801927-4 A2 | 1/2009 |
| CN | 200520115973 | 1/2007 |
| CN | 200820078842 | 1/2009 |
| CN | 20080028892 Y | 3/2009 |
| DE | 10007083 A1 | 8/2001 |
| EP | 1160647 A2 | 12/2001 |
| EP | 1408459 A1 | 4/2004 |
| WO | 9941717 A1 | 8/1999 |
| WO | 0106338 A2 | 1/2001 |
| WO | 03029134 A1 | 4/2003 |
| WO | 2004/090819 A3 | 10/2004 |
| WO | 2008077964 A1 | 7/2008 |
| WO | 2009/029425 A1 | 3/2009 |

OTHER PUBLICATIONS

Press release entitled "Maxim's 32-Bit USIP Secure Microcontroller Provides Platform for First PCI PED 2.0 Certified Encrypted PIN Pad," dated Feb. 25, 2009, Sunnyvale, California, USA.

International Search Report and Written Opinion mailed on Sep. 23, 2010 by the European Patent Office as the International Searching Authority for copending international application No. PCT/EP2010/015118.

* cited by examiner

FUEL DISPENSER USER INTERFACE

CROSS-REFERENCE TO RELATED APPLICATIONS

This application claims the benefit of U.S. provisional patent application Ser. No. 61/185,451, filed on Jun. 9, 2009 and entitled "Fuel Dispenser User Interface," which is hereby incorporated by reference as if set forth verbatim herein and relied upon for all purposes.

FIELD OF THE INVENTION

The present invention relates generally to a user interface, and, more particularly, to a user interface for a fuel dispenser.

BACKGROUND OF THE INVENTION

Fuel dispensers dispense petroleum and alternative fuel products at retail service stations and convenience store operations around the world. Fuel dispensers have user interfaces, including displays and keypads, for effecting customer payment transactions. These user interfaces include credit/debit magnetic card readers for retrieving account information from the customer. Other point-of-sale ("POS") terminals also include similar user interfaces.

These user interfaces, and in particular fuel dispenser interfaces accessible to the public in the open, have become subject to attack by individuals desiring to acquire account information from customers that have used the dispenser. There is a concern that display interfaces may be compromised so that the interfaces present false prompts to customers in an attempt to acquire this account information. When customers respond to these false prompts, their account information may be seized and used improperly and fraudulently.

The potential for such tampering has resulted in the adoption of certain physical security measures for fuel dispenser user interfaces. These security measures include mounting the display within a secure enclosure with the display controller. Alternatively, the display has been mounted to a secure enclosure and the display controller has been placed within the secure enclosure. In either case, the data and control lines for the display are not exposed and cannot be as easily compromised. Such arrangements, however, do not prevent removal of the entire user interface.

A conventional user interface for a fuel dispenser typically requires a user to complete several steps during a payment transaction. The user may provide sensitive information or data, such as a personal identification number ("PIN") or account information, to complete the payment transaction. Attempts to intercept or otherwise obtain sensitive data provided to a payment terminal before it reaches its destination, such as a host processing system, have increased. With respect to fuel dispensers, for instance, attempts have been made to connect a device between the payment terminal and the processing system in order to intercept the sensitive data while in transit. As a result, payment terminals incorporate various mechanisms to protect and secure the sensitive data. For example, the payment terminal's circuit board comprising the components tasked with handling the sensitive data may be wrapped in a protective mesh covering that is operatively connected to the components. The components are disabled if the mesh covering's integrity is impaired in any way.

Additional room exists in the art for further security techniques.

SUMMARY OF THE INVENTION

The present invention recognizes and addresses the foregoing considerations, and others, of prior art construction and methods.

In this regard, one aspect of the present invention provides a user interface for a fuel dispenser adapted to handle sensitive information. The user interface comprises a display board, a display operatively connected to the display board, and control circuitry. The control circuitry comprises a processor, memory, and a first trigger. The display board and the control circuitry are in respective planes that are generally parallel to one another. A portion of the display board physically overlays a portion of the control circuitry so that the first trigger is connected to the display board portion.

Another aspect of the present invention provides the user interface set forth above being configured to erase any sensitive information stored in the memory upon activation of the trigger.

Yet another aspect of the present invention provides a fuel dispenser comprising control circuitry, a display, and a frame. The control circuitry comprises a processor, memory, and a trigger. The display is operatively connected to the processor. The frame is configured to support the control circuitry and the display. Activation of the trigger causes sensitive information stored in the memory to be erased.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
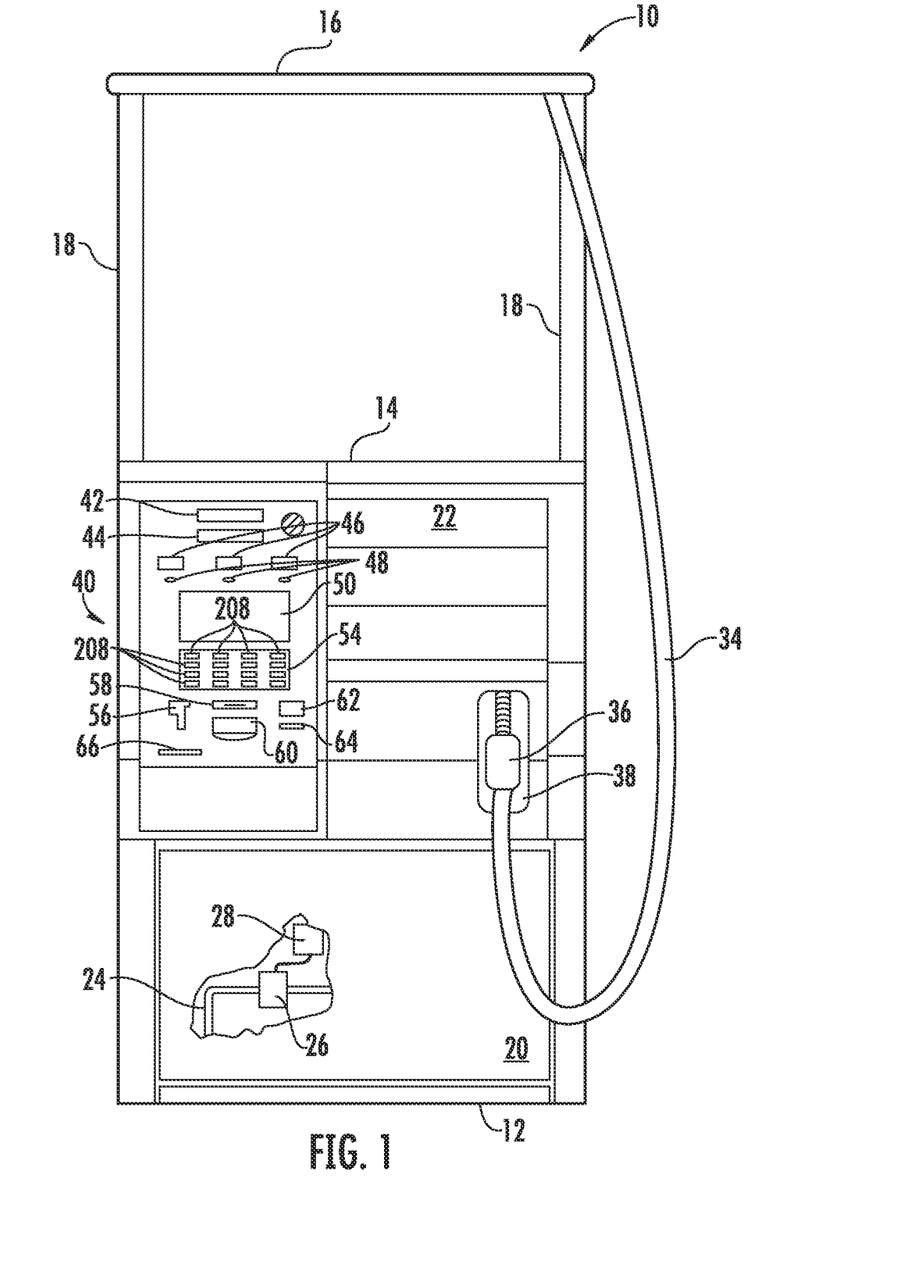
FIG. 1 is a front elevation view of a fuel dispenser in accordance with an embodiment of the present invention.

FIG. 1 illustrates a fuel dispenser 10 comprising a base 12 and a top 14, with a canopy 16 supported by two side panels 18. Fuel dispenser 10 is subdivided into multiple compartments including a hydraulic area 20 configured to enclose hydraulic components and an electronic area 22 configured to enclose electronic components. A vapor barrier may be used to separate hydraulic area 20 from electronic area 22.

Several components used to control fuel flow are enclosed within hydraulic area 20. Fuel from underground storage tanks is pumped through a piping network into flow conduits within fuel dispenser 10, such as inlet pipe 24.

When fuel is dispensed, fuel travels through a meter 26, which is responsive to the flow rate or volume of fuel passing through the meter as should be understood by those of ordinary skill in the art. A pulser 28 generates a signal that is indicative of the flow rate or volume of fuel passing through meter 26. As fuel is dispensed, it is delivered to a hose 34, through a nozzle 36, and into a customer's vehicle. While at rest, nozzle 36 is maintained in a suitable cradle 38.

Fuel dispenser 10 also includes a user interface 40 to allow a user/customer to interact with and engage in a dispenser transaction at the fuel dispenser. User interface 40 may include a variety of input and output devices. For instance, user interface 40 may include a transaction price total display 42 to present the customer with the total price to be charged to the customer for the received fuel. User interface 40 may also include a transaction volume total display 44 to present the customer with the measurement of the volume of fuel dispensed from fuel dispenser 10 in units of gallons or liters.

In the embodiment presented by FIG. 1, fuel dispenser 10 is a multi-product dispenser that is capable of dispensing different grades of fuel. The price-per-unit for each grade of fuel is presented on displays 46. Octane selection buttons 48 are provided in order to allow the customer to select which grade of fuel is to be dispensed before dispensing is initiated.

User interface 40 comprises a display 50 and a keypad interface 54. Display 50 is configured to provide instructions, prompts, advertising, and/or other information to the customer. Customers provide responses or selections to the instructions or prompts using keypad interface 54. For instance, display 50 may instruct a customer to enter a PIN, which the customer may accomplish by depressing the appropriate keys of keypad interface 54. Fuel dispenser 10 may also include a card reader 56 that is adapted to receive a magnetic stripe card, such as a credit or debit card, for payment of any fuel dispensed. Fuel dispenser 10 may additionally comprise other payment or transactional type devices to receive payment information for transaction processing associated with transactions such as a pre-paid dispenser transaction. Examples of such devices include a bill acceptor 58, an optical reader 60, a smart card reader 62, and a biometric reader 64. Fuel dispenser 10 preferably includes a receipt printer 66 configured to print information evidencing the transaction performed at fuel dispenser 10. One of ordinary skill in the art will appreciate that the components described above may be arranged in various configurations without departing from the scope of the present invention.

Figure 2:
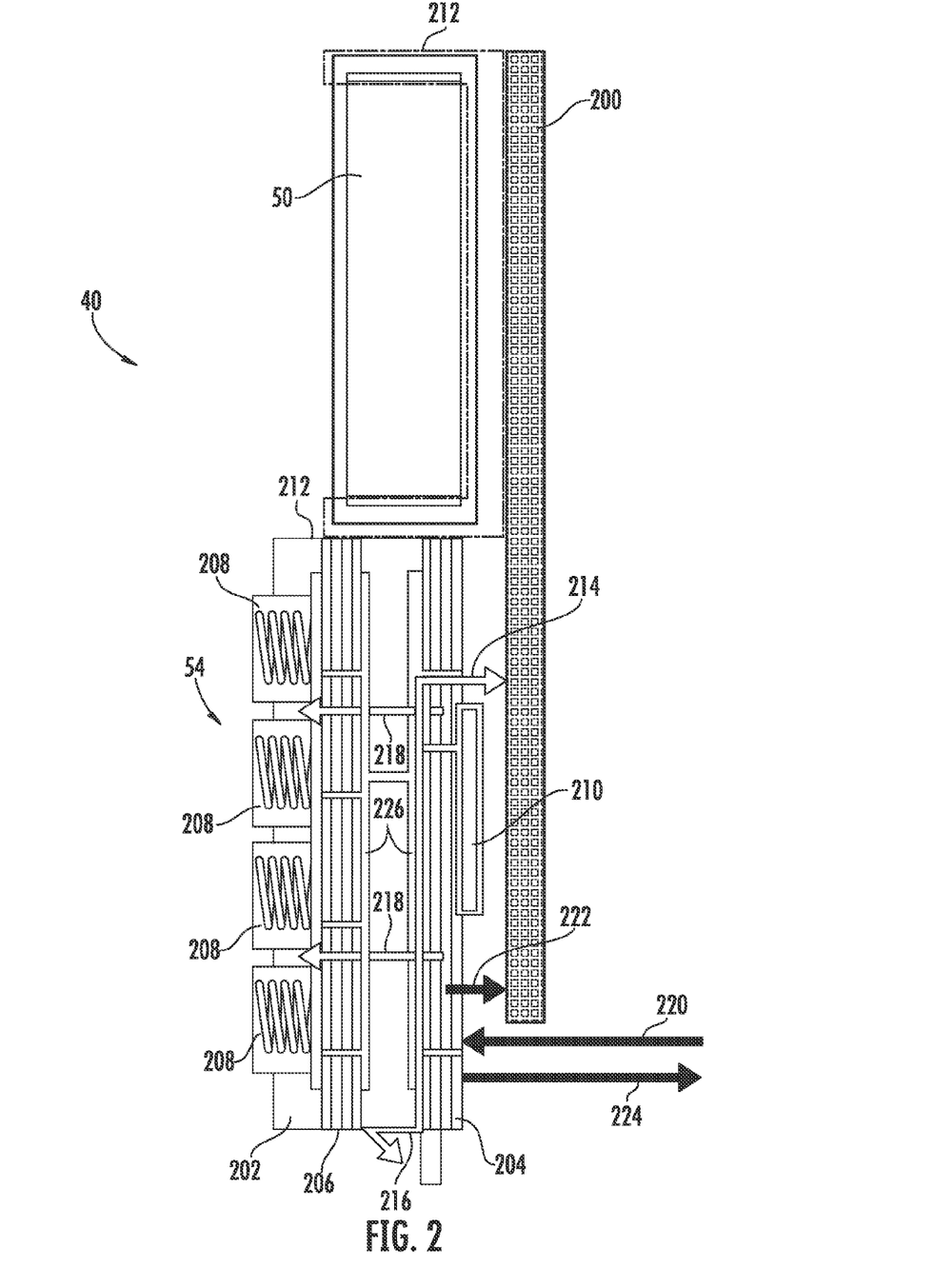
FIGS. 2 and 3 are side and rear schematic representations, respectively, of a preferred user interface that may be utilized in the fuel dispenser of FIG. 1.
Figure 3:
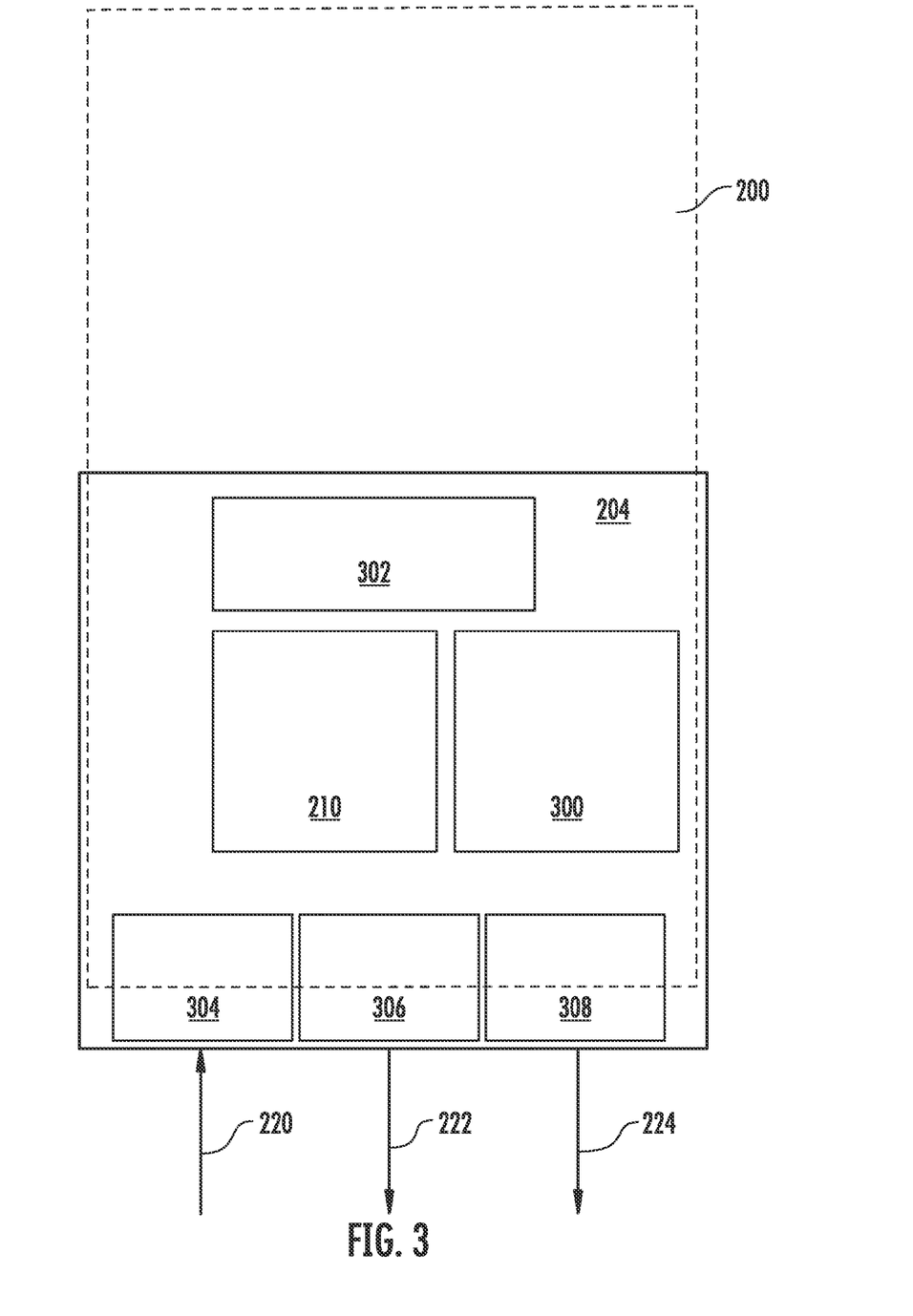

FIGS. 2 and 3 are schematic representations of user interface 40 in accordance with one aspect of the present invention. User interface 40 comprises display 50, keypad interface 54, display controller 200, a frame 202, and a controller printed circuit board ("PCB") 204. (In FIG. 3, display controller 200 is shown in broken lines in order to allow the other components of user interface 40 to be examined.) It should be understood that display controller 200 may be any suitable display controller or suitable display board configured to control, communicate with, or otherwise provide display 50 with data representative of material to be presented by the display and provide connections in order to communicate with external sources.

Keypad interface 54 comprises a keypad PCB 206 and a plurality of individual keys (denoted at 208) connected to the keypad PCB. Keypad interface 54 (and, specifically, keypad PCB 206) and controller PCB 204 are operatively connected to one another and mounted to frame 202. Display 50 may also be mounted a top surface 212 of frame 202. As shown in FIG. 3, controller PCB 204 may also comprise additional connections, such as client connection 304, display board connection 306, and reader module connection 308.

Controller PCB 204 includes a processing device 210, memory 300, and a graphic controller 302. Processing device 210 may be a processor, microprocessor, controller, microcontroller, or other circuitry. In an exemplary embodiment, processing device 210 is a secure 32-bit microcontroller, such as the USIP chip provided by MAXIM INTEGRATED PRODUCTS of Austin, Tex. Memory 300 may be any memory or computer-readable medium as long as it is capable of being accessed by processing device 210, including random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Additionally, when information is transferred or provided over a connection, such as connections 304, 306, and 308, processing device 210 recognizes the connection as computer-readable medium. Such a connection should therefore be included in the definition of "memory." Preferably, memory 300 is encrypted RAM. Processing device 210 may also include a portion of memory accessible only to the processing device.

Memory 300 comprises computer-executable program code or instructions that when executed by processing device 210 perform one or more steps of the processes described in more detail below. Memory 300 may also comprise data and one or more data structures or databases for storing information. The computer-executable program code or instructions in this scenario, as should be known to those skilled in the art, usually includes one or more application programs, other program modules, and program data. Computer-executable program code or instructions may also be stored on the memory of processing device 210. In an exemplary embodiment, memory 300 stores one or more encryption algorithms, keys, and/or codes used to encrypt confidential information as described in more detail below.

Processing device 210 includes a first microswitch that connects the processing device to display controller 200 (denoted by arrow 214) and a second microswitch that connects the processing device to frame 202 or to fuel dispenser 10 itself (denoted by arrow 216). It should be understood that these microswitches may be incorporated into controller PCB 204 rather than processing device 210. Similarly, controller PCB 204 includes one or more microswitches that connect the controller PCB to keypad PCB 206, another portion of keypad interface 54, frame 202, and/or fuel dispenser 10 itself (denoted by arrows 218). It should be understood by those of ordinary skill in the art that the connections provided by microswitches 214, 216, and 218 may be either electrical or physical connections and may, therefore, be accomplished by other suitable instruments, such as contact screws.

Client connection 304 operatively connects controller PCB 204 to a POS device located within the retail fueling environment (denoted by arrow 220) in order to transmit and receive data to and from the POS device. Display board connection 306 operatively connects controller PCB 204 to display controller 200 (denoted by arrow 222) in order to transmit data representative of material to be presented by display 50. Graphic controller 302 manages the information and data to be transmitted to display controller 200 as should be understood by those of ordinary skill in the art.

Reader module connection 308 operatively connects controller PCB 204 to a card reader configured to receive information from a payment instrument provided by a customer (denoted by arrow 224). It should be understood by those of ordinary skill in the art that "card reader" generically includes any device capable of receiving financial information from a customer, such as by "reading" either magnetic stripe cards (such as debit and credit cards), devices including a chip (such as smartcards), or contactless cards (such as those incorporating radio frequency identification ("RFID") tags). In the presently-described embodiment, the card reader is separate from user interface 40. In another embodiment, the card reader is a component of user interface 40 and mounted to and/or within frame 202 onto a PCB, similar to keypad PCB 206. In such an embodiment, the card reader PCB is operatively connected to controller PCB 204 in the same manner as keypad PCB 206, as described herein. Alternatively, the card reader is operatively connected to keypad PCB 206, similar to the manner in which keys 208 are operatively connected to the keypad PCB. It should also be understood that a switch, like switches 214 and 216, may be included to connect controller PCB 204 to the card reader or its associated PCB.

The following description provides an example of the use and operation of fuel dispenser 10 and its components with reference to FIGS. 1, 2, and 3 in accordance with an embodiment of the present invention. It should be understood by those of ordinary skill in the art that the method, manner, and sequence set forth in the following description may be varied without departing from the scope of the present invention. For instance, the following description is directed to a preprocessing payment transaction through the use of a debit card but should also be applicable to a post-processing payment transaction involving the use of a credit card.

A customer positions a vehicle adjacent to fuel dispenser 10 and approaches user interface 40. Display 50 presents payment options to the customer, of which one option is to prepay using a debit card. In this example, the customer selects this option using keypad interface 54. The customer follows the instructions provided by display 50 to insert and remove the customer's debit card using card reader 56. Card reader 56 transmits the account information stored on the debit card to processing device 210, which encrypts and stores the information in memory 300. Display 50 prompts the customer to provide the PIN by selecting the appropriate keys 208 of keypad interface 54. As should be understood by one of ordinary skill in the art, keypad PCB 206 transmits data to processing device 210 representative of each key 208 selected by the user. Processing device 210 encrypts the data received from keypad PCB 206 representative of the customer's PIN and stores the data in memory 300.

Processing device 210 then transmits the customer's account information and data representative of the customer's PIN to a host processing system of the financial institution responsible for the customer's account in order to verify the payment information. Alternatively, processing device 210 transmits the information and data to the POS device within the retail fueling environment to handle processing of the payment information. In another embodiment, card reader 56 transmits the account information directly to the POS device, while processing device 210 transmits the PIN data directly to the POS device, which then handles the transaction processing.

One of ordinary skill in the art will appreciate that receipt and transmission of such information and data is generally accomplished by encrypting the data to be transmitted using an encryption algorithm and key, which is then decrypted by the receiving device using the same encryption algorithm and key. It should be further appreciated that any number of encryption techniques known to those of ordinary skill in the art may be used. Payment transaction processing should be otherwise understood by those of ordinary skill in the art and is, therefore, not discussed in further detail.

Referring specifically to FIGS. 2 and 3, user interface 40 is designed to prevent tampering with or acquiring access to confidential customer information, such as account information or PINs. Separation of display controller 200 from controller PCB 204, or vice versa, triggers microswitch 214. Additionally, removal of controller PCB 204 from frame 202 or from fuel dispenser 10 triggers microswitch 216. Likewise, removal of controller PCB 204 from keypad PCB 206, or vice versa, triggers one or more microswitches 218. In the event that any of microswitches 214, 216, or 218 are triggered, the encryption algorithms and/or keys stored in memory 300 are erased. This may be effected by processing device 210 or by another component of controller PCB 204 tasked with destruction of the encryption information. In another embodiment, triggering one or more of microswitches 214, 216, and 218 results in the erasure or destruction of all information stored in memory 300. As a result, access to sensitive customer information is prevented by deleting the information when an indication is received that one or more components of user interface 40 have been separated or removed. In one embodiment, this may be accomplished even when power has been disconnected from controller PCB 204 via a battery included in the PCB and operatively connected to processing device 210 and/or memory 300. It should be understood that access to the battery requires separation of the PCB from display controller 200, thereby causing one or more of the switches to be activated. For instance, processing device 210, such as the USIP chip described above, includes a battery-powered key area that erases the sensitive data or encryption information upon tampering. That is, processing device 210 and/or memory 300 may be configured to erase any sensitive information upon activation of one of the microswitches even when power is disconnected from controller PCB 204. In another embodiment, processing device 210 and/or memory 300 is configured to erase any sensitive information stored therein in the event controller PCB 204 loses power.

In another embodiment, user interface 40 additionally comprises an internal layer of meshing 226 encasing the surfaces of PCBs 204 and 206 that face one another. Meshing 226 is connected to controller PCB 204 in a manner that allows the controller PCB to recognize when the integrity of meshing 226 has been compromised. If this occurs, any sensitive information stored in memory 300 or the memory of processing device 210 is erased. In yet another embodiment, meshing 226 only encases the surface of controller PCB 204 that faces keypad interface 54, but otherwise functions in a manner similar to that described above.

In an embodiment where a card reader is part of user interface 40 as described above, removal of the card reader or its associated PCB triggers the switch that operatively connects controller PCB 204 to the card reader or its associated PCB. The encryption algorithms and/or keys stored in memory 300 may be erased upon activation of this switch in a manner similar to that described above. Additionally, meshing may also be used to encase the entirety or just the surface of the card reader's associated PCB in a manner similar to that described above with respect to meshing 226 and PCBs 204 and 206. Compromising or otherwise impairing the integrity of the meshing connected to the card reader's PCB may also cause any sensitive information or data stored in memory 300 to be deleted.

In another embodiment, display 50 is a touch screen. In this embodiment, the touch screen may be configured to provide the functionality provided by keypad interface 54 in the embodiments described above. Accordingly, keypad interface 54 (including keypad PCB 206) may be omitted from user interface 40 in such an embodiment. Separation of controller PCB 204 from display controller 200 activates microswitch 214, thereby causing any sensitive data stored by processing device 210 and/or memory 300 to be erased and/or destroyed, in a manner similar to that described above. It should be understood that, in this scenario, display 50, controller PCB 204, and display controller 200 may be rearranged without departing from the scope of the present invention in order to compensate for the omission of keypad interface 54 and/or an increase in size of display 50. For example, controller PCB 204 may be located between display 50 and display controller 200. In such an embodiment, microswitches 216 or 218 may operatively connect controller PCB 204 to display 50. Activation of one of the microswitches would have an effect similar to that described above. That is, activation of microswitch 216 or 218 due to separation of controller PCB 204 from display 50 would cause any sensitive information stored in memory 300 to be erased.

It should be understood that the above description provides a user interface configured to present instructions to a user and to receive confidential information in response. The user interface receives and maintains the information in a secure manner and includes one or more devices adapted to indicate when at least one of the user interface's components has been removed or tampered with. Upon such an indication, the user's confidential information is erased or the encryption algorithms and/or keys required to decrypt the confidential information are erased. Alternatively, all information stored by the user interface is erased. As a result, a user interface configured to protect confidential information for each user is provided. That is, the user interface removes or destroys all data stored therein or an amount of data sufficient to prevent the improper use of any sensitive information.

It should further be understood that the configuration of user interface 40 described above provides flexibility in manufacturing, selection, and arrangement of the interface's components. For example, the type, size, and placement of display 50 may vary depending on the requirements of the interface or dispenser as long as the corresponding display controller is capable of covering or connecting to the microswitch located on processing device 210 or on controller PCB 204. Thus, a larger display may be used without having to modify the configuration of the other components of user interface 40. Moreover, display 50 may be adjusted or angled for better viewing by a customer depending on the configuration of fuel dispenser 10 as long as the connection between display controller 200 and processing device 210 or controller PCB 204 remains secure.

Other security measures may be incorporated into the present invention as well for additional security. For instance, the present invention may include the remote display security measure disclosed in U.S. patent application Ser. No. 11/562,150, which is hereby incorporated by reference as if set forth verbatim herein, without hindering the security measures described above. In an embodiment of the present invention incorporating the remote display security measure disclosed in application Ser. No. 11/562,150, display 50 may be located remotely from display controller 200 while minimizing any exposure of user interface 40 to additional tampering or security risks. Alternatively, both display 50 and display controller 200 may be located remotely from controller PCB 204. By way of another example, the present invention may also include the security measure disclosed in European Patent Application Serial No. 1 408 459 A1 filed on Oct. 9, 2003, the entire disclosure of which is incorporated by reference as if set forth verbatim herein.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A user interface for a fuel dispenser adapted to handle sensitive information, the user interface comprising:
   a display board;
   a display operatively connected to the display board and overlaying a first portion of the display board;
   a keypad interface overlaying a second portion of the display board, said keypad interface having a plurality of physical buttons depressible by a user;
   control circuitry comprising a processor and memory together operative to handle sensitive customer information, said control circuitry further comprising a first trigger, wherein the control circuitry is located between the second portion of the display board and the keypad interface so that the first trigger is connected to the display. board and is operative to detect separation of said display board from said control circuitry, such that access to the control circuitry for tampering purposes will be impeded by the display board and the keypad interface; and
   a frame, wherein the display and the control circuitry are mounted to the frame; and
   wherein a second trigger operatively connects the control circuitry to the frame and activation of the second trigger causes sensitive information stored in the memory to be erased.

2. The user interface of claim 1 wherein activation of the first trigger causes sensitive information stored in the memory to be erased.

3. The user interface of claim 1 wherein the first trigger is physically connected to the control circuitry and the display board.

4. The user interface of claim 1 further comprising a reader module operatively connected to the control circuitry.

5. The user interface of claim 4 wherein the reader module receives at least a portion of the sensitive information from a debit or credit card.

6. The user interface of claim 1 wherein the first trigger is a trigger selected from the group consisting of a mechanical trigger, a physical trigger, an electrical trigger, a software enabled trigger, and a signal.

7. The user interface of claim 1 wherein the display comprises a touch screen.

8. The user interface of claim 1 wherein the control circuitry comprises a controller circuit board adjacent to said display board.

9. A user interface for a fuel dispenser adapted to handle sensitive information, the user interface comprising:
a display board;
a display operatively connected to the display board and overlaying a first portion of the display board;
a keypad interface overlaying a second portion of the display board, said keypad interface having a plurality of physical buttons depressible by a user; and
control circuitry comprising a processor, memory, and a first trigger, wherein the control circuitry is located between the second portion of the display board and the keypad interface so that the first trigger is connected to the display board and is operative to detect separation of said display board from said control circuitry, such that access to the control circuitry for tampering purposes will be impeded by the display board and the keypad interface,
wherein the first trigger is physically connected to the control circuitry and the display board and the first trigger comprises a microswitch.

10. The user interface of claim 9 wherein the first trigger physically connects the processor to the display board.

11. The user interface of claim 10 wherein the processor comprises the first trigger.

12. The user interface of claim 9 wherein activation of the first trigger causes sensitive information stored in the memory to be erased.

13. The user interface of claim 9 further comprising a frame, wherein the display and the control circuitry are mounted to the frame.

14. The user interface of claim 13 wherein a second trigger operatively connects the control circuitry to the frame and activation of the second trigger causes sensitive information stored in the memory to be erased.

15. The user interface of claim 9 further comprising a reader module operatively connected to the control circuitry.

16. The user interface of claim 15 wherein the reader module receives at least a portion of the sensitive information from a debit or credit card.

17. The user interface of claim 15 wherein a second trigger operatively connects the control circuitry to the reader module and activation of the second trigger causes sensitive information stored in the memory to be erased.

18. A user interface for a fuel dispenser adapted to handle sensitive information, the user interface comprising:
a display board;
a display operatively connected to the display board and overlaying a first portion of the display board;
a keypad interface overlaying a second portion of the display board, said keypad interface having a plurality of physical buttons depressible by a user;
control circuitry comprising a processor, memory, and a first trigger, wherein the control circuitry is located between the second portion of the display board and the keypad interface so that the first trigger is connected to the display board and is operative to detect separation of said display board from said control circuitry, such that access to the control circuitry for tampering purposes will be impeded by the display board and the keypad interface; and
a reader module operatively connected to the control circuitry, wherein a second trigger operatively connects the control circuitry to the reader module and activation of the second trigger causes sensitive information stored in the memory to be erased.

19. The user interface of claim 18 wherein the reader module is a magnetic stripe card reader.

20. The user interface of claim 18 wherein the reader module is a radio frequency identification reader.

21. A user interface for a fuel dispenser adapted to handle sensitive information, the user interface comprising:
a display board;
a display operatively connected to the display board and overlaying a first portion of the display board;
a keypad interface overlaying a second portion of the display board, said keypad interface having a plurality of physical buttons depressible by a user;
control circuitry comprising a processor and memory together operative to handle sensitive customer information, said control circuitry further comprising a first trigger, wherein the control circuitry is located between the second portion of the display board and the keypad interface so that the first trigger is connected to the display board and is operative to detect separation of said display board from said control circuitry, such that access to the control circuitry for tampering purposes will be impeded by the display board and the keypad interface; and
a second trigger connected to the control circuitry and the keypad interface,
wherein activation of the second trigger causes sensitive information stored in the memory to be erased.

22. The user interface of claim 21 wherein the second trigger is physically connected to the keypad interface and the control circuitry.

23. A user interface for a fuel dispenser adapted to handle sensitive information, the user interface comprising:
a display board;
a display operatively connected to the display board;
control circuitry comprising a processor and memory together operative to handle sensitive customer information, said control circuitry further comprising a first trigger, wherein the display board and the control circuitry are in respective planes that are generally parallel to one another, and a portion of the display board physically overlays a portion of the control circuitry so that the first trigger is connected to the display board portion;
wherein the control circuitry is located between the display and the display board such that the first trigger is operative to detect separation of said display board from, said control circuitry, and access to the control circuitry for tampering purposes will be impeded by the display and the display board; and
wherein the control circuitry further comprises a second trigger connected to the display, and separation of the control circuitry from the display board activates first trigger, separation of the control circuitry from the display activates the second trigger, and activation of either trigger causes any sensitive information stored in the memory to be erased.

24. The user interface of claim 23 wherein the display comprises a touch screen.

25. The user interface of claim 23 wherein the display comprises a touch screen.

26. The user interface of claim 23 further comprising a reader module operatively connected to the control circuitry.

27. The user interface of claim 26 wherein the reader module receives sensitive information from a debit or credit card.

28. The user interface of claim 23 wherein the first trigger is a trigger selected from the group consisting of a mechanical trigger, a physical trigger, an electrical trigger, a software enabled trigger, and a signal.

29. The user interface of claim 23 wherein the control circuitry comprises a controller circuit board adjacent to said display board.

30. The user interface of claim 28 wherein said controller circuit board and said display board comprise wire mesh encasing at least a portion of the surfaces thereof.

31. A user interface for a fuel dispenser adapted to handle sensitive information, the user interface comprising:
   a display board;
   a display operatively connected to the display board;
   control circuitry comprising a processor, memory, and a first trigger, wherein the display board and the control circuitry are in respective planes that are generally parallel to one another, and a portion of the display board physically overlays a portion of the control circuitry so that the first trigger is connected to the display board portion; and
   wherein the control circuitry is located between the display and the display board such that the first trigger is operative to detect separation of said display board from said control circuitry, and access to the control circuitry for tampering purposes will be impeded by the display and the display board,
   wherein the first trigger comprises a microswitch.

32. The user interface of claim 31 wherein the control circuitry comprises a second trigger connected to the display, and separation of the control circuitry from the display board activates first trigger, separation of the control circuitry from the display activates the second trigger, and activation of either trigger causes any sensitive information stored in the memory to be erased.

33. The user interface of claim 32 wherein the display comprises a touch screen.

34. The user interface of claim 31 further comprising a reader module operatively connected to the control circuitry.

35. The user interface of claim 34 wherein the reader module receives sensitive information from a debit or credit card.

36. The user interface of claim 31 wherein the control circuitry comprises a controller circuit board adjacent to said display board.

37. A user interface for a fuel dispenser adapted to handle sensitive information, the user interface comprising:
   a display board;
   a display operatively connected to the display board and overlaying a first portion of the display board;
   a keypad interface overlaying a second portion of the display board, said keypad interface having a plurality of physical buttons depressible by a user; and
   control circuitry comprising a processor, memory, and a first trigger, wherein the control circuitry is located between the second portion of the display board and the keypad interface so that the first trigger is connected to the display board and is operative to detect separation of said display board. from said control circuitry, such that access to the control circuitry for tampering purposes will be impeded by the display board and the keypad interface,
   wherein the control circuitry comprises a controller circuit board adjacent to said display board and wherein said controller circuit board and said display board comprise wire mesh encasing at least a portion of the surfaces thereof.

* * * * *

UNITED STATES PATENT AND TRADEMARK OFFICE
CERTIFICATE OF CORRECTION

| | | |
|---|---|---|
| PATENT NO. | : 8,874,937 B2 | Page 1 of 1 |
| APPLICATION NO. | : 12/797094 | |
| DATED | : October 28, 2014 | |
| INVENTOR(S) | : Giovanni Carapelli | |

It is certified that error appears in the above-identified patent and that said Letters Patent is hereby corrected as shown below:

Claims

In Claim 1, column 8, line 37, please delete the "." between the words "display" and "board.".

In Claim 30, column 11, line 4, please delete "28" and replace with --29--.

Signed and Sealed this
Sixteenth Day of February, 2016

Michelle K. Lee
*Director of the United States Patent and Trademark Office*